US009316238B2

(12) United States Patent
Vainonen et al.

(10) Patent No.: US 9,316,238 B2
(45) Date of Patent: Apr. 19, 2016

(54) APPARATUS, METHOD AND COMPUTER PROGRAM PRODUCT FOR MOVING CARGO, AND A KIT AND METHOD FOR UPGRADING AN APPARATUS FOR MOVING CARGO

(71) Applicant: KONECRANES PLC, Hyvinkää (FI)

(72) Inventors: Pekka Vainonen, Hyvinkää (FI); Ilkka Leppänen, Hyvinkää (FI); Jens Wachsmuth, Hyvinkää (FI)

(73) Assignee: Konecranes Global Corporation, Hyvinkää (FI)

( * ) Notice: Subject to any disclaimer, the term of this patent is extended or adjusted under 35 U.S.C. 154(b) by 695 days.

(21) Appl. No.: 13/681,113

(22) Filed: Nov. 19, 2012

(65) Prior Publication Data

US 2013/0125540 A1 May 23, 2013

(30) Foreign Application Priority Data

Nov. 21, 2011 (FI) .................................. 20116157 U

(51) Int. Cl.

| | |
|---|---|
| ***F16D 31/02*** | (2006.01) |
| ***F15B 15/00*** | (2006.01) |
| ***F15B 21/14*** | (2006.01) |
| ***B66C 13/18*** | (2006.01) |
| ***F15B 1/02*** | (2006.01) |

(52) U.S. Cl.

CPC ................. *F15B 15/00* (2013.01); *B66C 13/18* (2013.01); *F15B 1/024* (2013.01); *F15B 21/14* (2013.01);

(Continued)

(58) Field of Classification Search

CPC ................................ F15B 21/14; F16H 61/30

USPC ........................................................... 60/414

See application file for complete search history.

(56) References Cited

U.S. PATENT DOCUMENTS

2003/0173159 A1 9/2003 Moser
2008/0048497 A1 * 2/2008 Donnelly et al. ............... 307/19

(Continued)

FOREIGN PATENT DOCUMENTS

CN 100427771 C 10/2008
CN 201634332 U 11/2010

(Continued)

OTHER PUBLICATIONS

Zhang, Modeling and analysis of hydraulic energy storage system for hybrid locomotives (2010).Theses and Dissertation Paper 1030.*

*Primary Examiner* — Edward Look
*Assistant Examiner* — Daniel Collins
(74) *Attorney, Agent, or Firm* — Birch, Stewart, Kolasch & Birch, LLP

(57) ABSTRACT

There is provided an apparatus, method, computer program product, and a kit and method for upgrading, an apparatus for moving cargo. A bus for transmission of electrical energy, at least one load connected to the bus, said at least one load configured to transform electrical energy from the bus into movement of a cargo with respect to the apparatus energy transforming means configured to transform energy between electrical energy of the bus and potential energy of a hydraulic accumulator, wherein the apparatus is configured to store electrical energy from the bus as potential energy to the hydraulic accumulator and to supply the potential energy stored in the hydraulic accumulator as electrical energy to the at least one load.

17 Claims, 4 Drawing Sheets

(52) U.S. Cl.
CPC .................. *F15B 2211/20515* (2013.01); *F15B 2211/20569* (2013.01); *F15B 2211/212* (2013.01); *F15B 2211/88* (2013.01)

(56) References Cited

U.S. PATENT DOCUMENTS

| | | | | |
|---|---|---|---|---|
| 2009/0173066 | A1 | 7/2009 | Duray | |
| 2009/0236156 | A1 * | 9/2009 | Promersberger et al. | 180/53.4 |
| 2010/0175579 | A1 * | 7/2010 | Read | 105/1.4 |
| 2011/0041490 | A1 | 2/2011 | Gogoana et al. | |

FOREIGN PATENT DOCUMENTS

| | | | |
|---|---|---|---|
| CN | 202007082 | U | 10/2011 |
| DE | 19745810 | A1 | 5/1998 |
| EP | 2 287 105 | A2 | 2/2011 |
| GB | 1522044 | A | 8/1978 |
| JP | 5-308798 | A | 11/1993 |
| JP | 2001-197785 | A | 7/2001 |
| WO | WO 2007/143841 | A1 | 12/2007 |
| WO | WO 2012/102654 | A1 | 8/2012 |

* cited by examiner

APPARATUS, METHOD AND COMPUTER PROGRAM PRODUCT FOR MOVING CARGO, AND A KIT AND METHOD FOR UPGRADING AN APPARATUS FOR MOVING CARGO

FIELD OF THE INVENTION

The present invention relates to employing a hydraulic accumulator for storing and supplying energy in an apparatus for moving cargo.

BACKGROUND OF THE INVENTION

Gantry cranes and straddle carriers used in ports are powered by diesel engines or they may have a connection the electric mains. Generally the gantry cranes and straddle carriers are used to pick up cargo containers at the port area for storing them in stacks or for loading the containers for transportation either by sea or land. These operations require lifting the cargo containers and to moving them to a desired location.

The weight of empty cargo containers may be over 2000 kg and their carrying capacity may be up to 40000 kg or more. Lifting such high loads poses a high requirement on the lifting power. When the containers are lifted up to a certain height and then lowered, potential energy is freed. Thereby, due to the weight of the cargo containers both the energy for lifting and lowering is high.

A conventional gantry crane may have a height of up to 7 cargo containers and a width of multiple cargo containers, thus covering multiple rows of cargo containers at a time. The large dimensions provide fast moving of containers between adjacent stacks and in the rows covered by the gantry.

A conventional straddle carrier may have a height of up to 4 cargo containers and a width of approximately 5 metres, thus being wide enough to cover one container at a time. The straddle carrier provides fast and flexible moving of containers between different areas of container terminals.

The power from the engine of the gantry crane and the straddle crane must be fed to the motors which may be located on the top of it, or at its foot, near the tires. Due to the large dimensions and the plurality of functions needing power in the gantry crane and straddle carrier, energy losses between the engine and the different functions may become large.

Hydraulic systems are generally used in cargo handling devices to transfer energy from the engine to the cargo handling. However, spillage of the hydraulic fluids may be environmentally harmful and hydraulic systems are vulnerable to leaks, which cause power leakage and thereby decrease in lifting capacity. Accordingly, also the maintenance costs of hydraulic lifting systems may be high due to short service interval needed to control the leakages.

When heavy cargo containers are lifted to high altitudes a lot of energy is needed. Once lifted to a high altitude, a cargo container has potential energy that is directly proportional to the altitude of the cargo container from the ground. When the cargo container is then lowered to a lower altitude, on top of another cargo container or to the ground, potential energy is released. Due to the large mass of the cargo containers, also the kinetic energy involved in moving them is large. In braking, the kinetic energy is released.

Due to the large mass of conventional gantry cranes and straddle carriers also the kinetic energy involved in their movement is large even without any payload. Thereby, the amount of energy needed in acceleration is large, whereby in deceleration kinetic energy is lost.

Accordingly, due to the high amount of energy involved in operating the gantry crane or straddle carrier, a peak power requirement may be very high while a lot of energy is released in deceleration and/or lowering cargo.

However, loosing high amounts of energy in cargo handling is not environmentally sustainable. With increasing cost of energy, energy efficiency of cargo handling is also an economical issue to companies operating cargo with gantry cranes and other cargo handling vehicles.

BRIEF DESCRIPTION OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various embodiments of the invention comprise an apparatus, a method and a computer program product as defined in the independent claims. Further embodiments of the invention are disclosed in the dependent claims.

According to an aspect there is provided an apparatus for moving cargo comprising a bus for transmission of electrical energy, at least one load connected to the bus, said at least one load configured to transform electrical energy from the bus into movement of a cargo with respect to the apparatus, energy transforming means configured to transform energy between electrical energy of the bus and potential energy of a hydraulic accumulator, wherein the apparatus is configured to store electrical energy from the bus as potential energy to the hydraulic accumulator and to supply the potential energy stored in the hydraulic accumulator as electrical energy to the at least one load.

According to another aspect there is provided a method comprising providing a bus for transmission of electrical energy, providing at least one load connected to the bus, said at least one load configured to transform electrical energy from the bus into movement of a cargo with respect to the apparatus, transforming energy between electrical energy of the bus and potential energy of a hydraulic accumulator, storing electrical energy from the bus as potential energy to the hydraulic accumulator and supplying the potential energy stored in the hydraulic accumulator as electrical energy to the load.

According to another aspect there is provided a computer program product comprising program instructions which, when loaded into the apparatus, cause the apparatus to perform a method according to an above aspect.

According to another aspect there is provided an apparatus comprising means configured to perform a method according an aspect.

According to another aspect there is provided a kit for upgrading an apparatus for moving cargo comprising a hydraulic accumulator for storing and supplying energy, an energy transforming means configured to transform energy between electrical energy and potential energy of the hydraulic accumulator; and controller means configured to control the transformer and the hydraulic accumulator to store electrical energy from the from the bus as potential energy to the hydraulic accumulator and supply the potential energy stored in the hydraulic accumulator as electrical energy.

According to another aspect there is provided a method of upgrading an apparatus for moving cargo comprising, installing a kit according to an aspect to the apparatus for moving cargo.

Some aspects provide improvements comprising providing a hydraulic accumulator for storing energy from a bus for transmission of electricity and obtained from movement of a cargo with respect to the apparatus carrying the cargo, and feeding the stored energy back to the bus so as to power the further movement of the cargo with respect to the apparatus and/or other functions including movement of the apparatus. This is achieved by the hydraulic accumulator connecting to the bus that powers the cargo-movement functions and/or other functions including those moving the whole apparatus, e.g. wheels. In this way energy from decelerating movement of the cargo may be stored into the hydraulic accumulator and used afterwards to power the cargo movement and/or other functions by feeding energy from the hydraulic accumulator to the bus. Further improvements will become apparent from the accompanying description.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
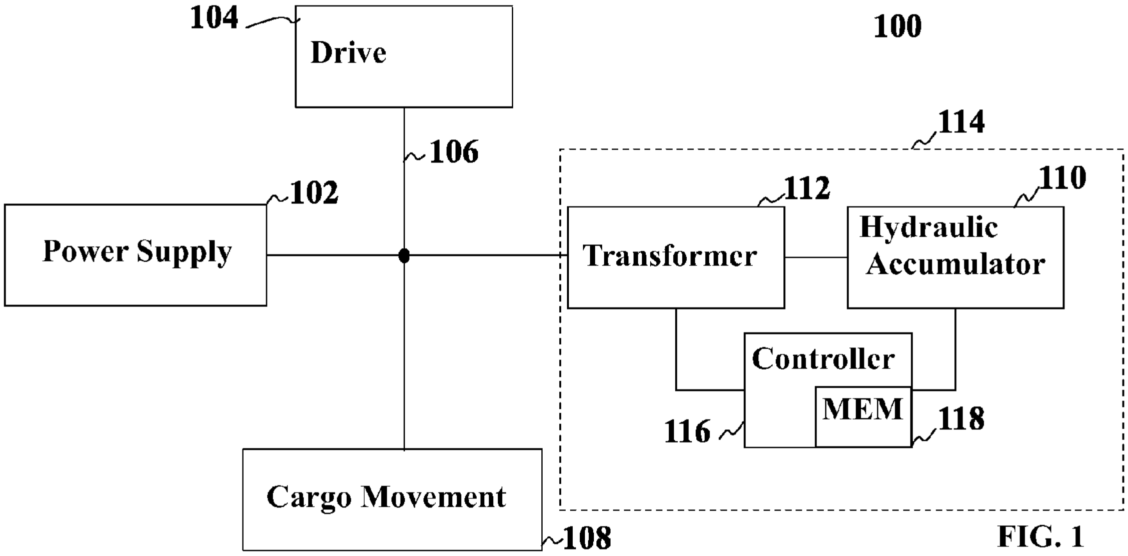
FIG. 1 illustrates an apparatus according to an embodiment.

FIG. 1 illustrates an apparatus for moving cargo 100 according to an embodiment. At least one load 104, 108 is connected to the bus. Each of the loads connects to the bus to transform electrical energy from the bus into movement of a cargo with respect to the apparatus. An energy recovery system 114 comprises a transformer 112 for transforming energy between electrical energy of the bus and potential energy of a hydraulic accumulator 110. A controller controls the transformer and the hydraulic accumulator to store electrical energy from the bus as potential energy to the hydraulic accumulator and supply the potential energy stored in the hydraulic accumulator as electrical energy to the at least one load.

The functions of the apparatus comprising drive function 104, cargo movement function 108 and the energy recovery system 114 receive power from the bus, thereby they are loads connected to the bus.

The drive function 104 and the cargo movement function are each configured to transform electrical energy from the bus into mechanical movement. The drive function moves the apparatus on a surface, and a cargo movement function moves a cargo carried by the apparatus with respect to the apparatus.

The apparatus comprises a power supply 102 connected to a bus 106 for transmission of electrical energy. The power supply may comprise a diesel engine, a combustion engine, an electrical generator supplying DC or AC, or an electrical connection through which electrical energy may be supplied to the bus in the form of AC or DC current. Examples of the electrical connection comprise a socket, a cable reel or a busbar system to the electric mains.

The power supply provides electrical energy to the bus. For that purpose the power supply may comprise energy transforming means to transform energy into electrical energy. For example a combustion engine and a diesel engine may be provided with a generator to transform the mechanical movement of the engine into electrical energy.

In an embodiment the bus comprises a transmission bus of electrical energy in the form of DC current. Accordingly, the bus may comprise a DC-rail, DC-busbar or DC-link. The bus is connectable by various functions of the apparatus, thereby forming an intermediate circuit between the functions and/or loads connected to the bus.

In an embodiment, the DC-bus may provide an intermediate circuit to functions and/or loads of the apparatus connected to the DC-bus via inverters. Each of the inverters transforms the DC from the DC-bus into AC, thereby performing DC/AC conversion. The DC/AC conversion may be optimized according to the specific requirement of each function, e.g. in terms of frequency, voltage, and/or current provided by the inverter.

The power supply feeds energy via the bus to a plurality of functions connected to the bus. These functions include but are not limited to the drive function 104, cargo movement function 108 and an energy recovery system 114. The plurality of functions is connected to the bus so as to receive electrical energy supplied from the power supply.

The drive function provides movement of the apparatus. The movement of the apparatus may be provided in a planar surface, for example in a port area. The drive function may comprise determining a direction of movement of the apparatus, i.e. steering, and moving the apparatus to the determined direction. Accordingly, the direction may be determined as forward, backward or to either side, left or right, of the apparatus.

The drive function may comprise one or more wheels and an energy transformer for receiving electrical energy from the bus and transforming the received electrical energy into movement of the wheels. Where the electrical energy in the bus is DC, the transformer may provide transforming the DC received from the bus into mechanical movement of the wheels.

The direction of movement may be determined in the drive function by a steering wheel that may turn the wheels to provide movement of the apparatus into the determined direction. The turning may comprise turning one or more of the wheels towards the determined direction and/or setting the rotational speeds of the one or more wheels to facilitate turning.

The cargo movement function may comprise a support for receiving a cargo to be moved and an energy transformer for receiving electrical energy from the bus and transforming the received electrical energy into movement of the cargo with respect to the apparatus. The support may comprise a hoist, a fork, or a spreader, for example which support the cargo such that the cargo may be picked up and moved with respect to the apparatus.

The cargo may comprise e.g. a freight container movable between different modes of transportation, e.g. transportation by sea and land, thus between ships and trucks. The freight containers may be provided in various sizes that are standardized and defined in International Organization for Standardization (ISO) 6346.

In an embodiment, the movement of the cargo with respect to the apparatus may be provided by lifting the cargo.

In an embodiment, the movement of the cargo may be provided as parallel and/or perpendicular to the surface of the movement of the apparatus. The perpendicular movement may be provided in a surface substantially perpendicular to the planar surface of movement of the apparatus. The parallel movement may be provided on a specific distance to the planar surface of movement. The specific distance may comprise e.g. an altitude where the cargo is lifted, e.g. 5 metres.

Accordingly, the movement of the cargo in the direction perpendicular to the planar surface of movement the apparatus may comprise lifting the cargo. The movement of the cargo in the direction parallel to the planar surface of movement the apparatus may comprise increasing or decreasing a distance measured between the cargo and any part of the cargo moving apparatus in the direction parallel to the planar surface of movement of the apparatus. It should be appreciated that the increase or decrease of distance is performed with respect to the parts of the apparatus that are not moving with the cargo, thus not including the part of the cargo-moving apparatus supporting the cargo.

The energy recovery system 114 may comprise energy storage 110 and a transformer 112. The transformer provides transformation of energy between the bus and the energy storage. Accordingly, in an embodiment energy in the bus is in different form than the energy in the energy recovery system, the transformer provides transformation between the different forms.

In an embodiment, the energy storage comprises one or more hydraulic accumulators 110 that store energy as potential energy. Then, the transformer provides transformation of electrical energy in the bus into potential energy of the hydraulic accumulator.

The hydraulic accumulator comprises potential energy stored in a pressurised fluid. The fluid may comprise gas or a liquid. A hydraulic accumulator storing energy in pressurized liquid comprise a weight-loaded and a spring-loaded accumulator, for example. The hydraulic accumulators storing energy in pressurized gas comprise a piston type, bladder type, and membrane accumulator, for example.

In an embodiment, the hydraulic accumulator stores energy in pressurised gas. The hydraulic accumulator may comprise separate spaces for the gas and for a liquid used to pressurize the gas. The spaces may be separated by a membrane as in a bladder type or membrane hydraulic accumulator or with a piston as in the piston type accumulator, so as to prevent mixing up the gas and the liquid. When liquid flows into the hydraulic accumulator the pressure in the space occupied by the liquid is increased. The pressure is transmitted to the gas, thereby pressurizing the gas. When liquid flows into the hydraulic accumulator the volume of the gas is decreased, which makes the pressure of the gas to increase. This pressure is then transmitted to the liquid as well. When liquid flows out of the accumulator the volume of the gas increases, which makes the pressure of the gas to decrease. This pressure is then transmitted to the liquid. Accordingly, it should be appreciated that the membrane should allow pressurizing the gas by the liquid flowing into the hydraulic accumulator and depressurizing the gas by the liquid flowing out of the hydraulic accumulator.

The energy recovery system may further comprise a controller 116 comprising memory 118. The controller connects to the transformer and the hydraulic accumulator by electric connections which may provide analog or digital transmission of signals and/or messages between the controller and the transformer and the hydraulic accumulator.

The controller may be a Programmable Logic Controller (PLC) comprising program code stored in the memory. The program code may provide control commands to the transformer and the hydraulic accumulator and processing of signals received from the transformer and the hydraulic accumulator. The controller may comprise a processor communicating with the memory to receive the program code or portions of the program code to be executed at the processor. The control of the energy recovery system comprising the trans-former and the hydraulic accumulator may be provided by the execution of the program code or one or more portions of the program code stored in the memory which cause the controller to process signals received from the trans-former and hydraulic accumulator and control their operation on the basis of the processing by transmitting signals to the hydraulic accumulator and transformer.

In an embodiment the apparatus 100 of FIG. 1 comprises a gantry crane, a straddle carrier, fork lift or lifttruck comprising a drive function, e.g. gantry drive 104 that provides movement of the gantry crane, a hoist winch 108 for moving cargo and an energy recovery system 114 including one or more hydraulic accumulators 110 for storing energy from the DC-rail 106 and supplying energy to the DC-rail.

Figure 2B:
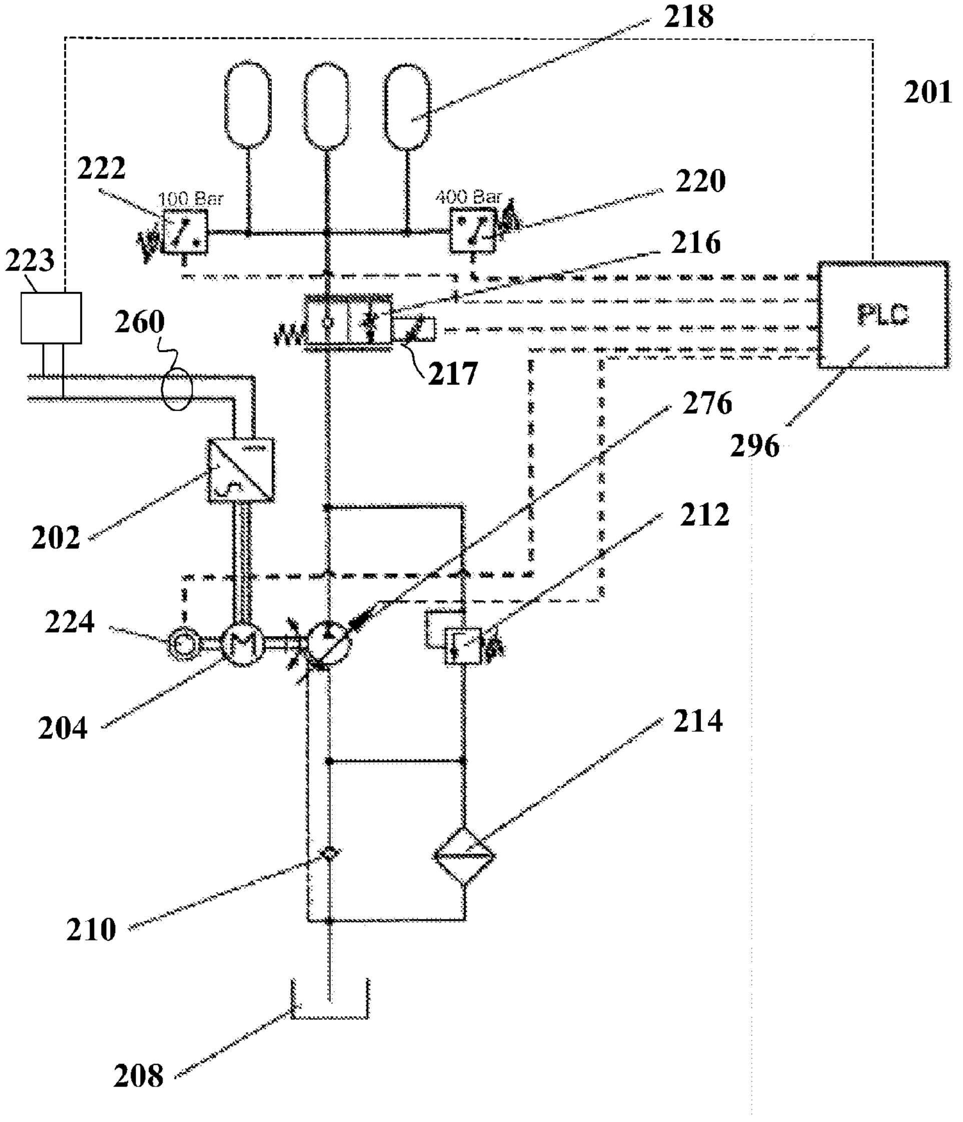
FIG. 2*b* illustrates an energy recovery system comprising a variable displacement pump according to an embodiment.
Figure 2A:
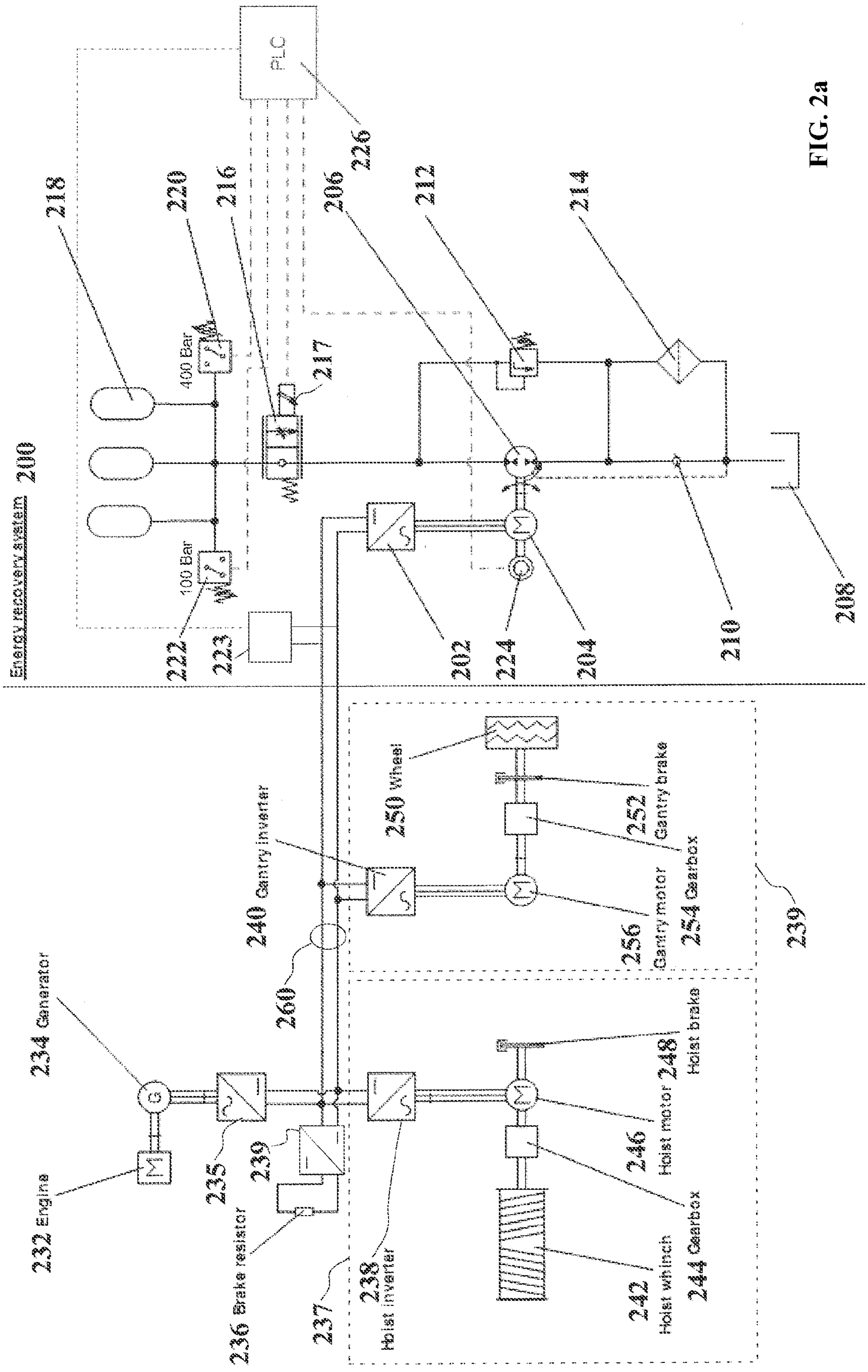
FIG. 2*a* illustrates a bus for transmission of electrical energy to functions providing movement of the apparatus and the cargo, and an energy recovery system connected to the bus according to an embodiment.

FIG. 2*a* illustrates a bus 260 for transmission of electrical energy to functions providing movement of the apparatus and the cargo, and an energy recovery system 200 connected to the bus according to an embodiment. The bus and energy recovery system of FIG. 2*a* may be included in the apparatus of FIG. 1, for example.

In FIG. 2*a*, a diesel engine 232 is operated to drive a generator 234 of AC current. The generated current is fed to an inverter 235 that converts the AC current from the generator into DC current that is fed to a DC-rail.

The DC-rail 260 provides transmission of electrical energy to a plurality of functions 237, 239 and the energy recovery system of the apparatus. Each of the plurality of functions and the energy recovery system is connected to the DC-rail to receive power. Accordingly, each of the plurality of functions and the energy recovery system may comprise a load connected to the DC-rail.

Referring to FIG. 2*a*, the bus provides transmission of electrical energy to a cargo movement function 237 and a drive function 239. The cargo movement function may comprise a hoist winch 242 connected to an electric motor, the hoist motor, 246 that drives the hoist winch 242 via a gearbox 244. The hoist motor is powered by the hoist inverter 238 converting DC from the bus to AC and feeding the AC to the hoist motor. A hoist brake 248 is connected to the hoist motor to mechanically decelerate the hoist motor and thereby the movement of the hoist winch driven by the hoist motor.

In an embodiment, the hoist brake may be connected either to the gearbox 244 or the hoist winch 242, to decelerate the hoist winch.

The drive function comprises one or more wheels 250 connected to an electric motor 256, the gantry motor that drives the wheel via a gearbox 254. The gantry motor is powered by the gantry inverter 240 converting DC from the bus to AC and feeding the AC to the gantry motor. A gantry brake 252 is connected to the wheel between the gearbox and the wheel to mechanically decelerate the rotational movement of the wheel. The deceleration of the gantry brake is transformed via the gearbox into deceleration of the gantry motor.

In an embodiment, the gantry brake may be connected to the gearbox 254 or the wheels 250, to decelerate the wheels.

A brake resistor 236 is connected to the DC-rail to provide dissipation of excess energy from the bus as heat. The brake resistor may connect the DC-rail via a brake chopper 239 that allows connecting the brake resistor to the DC-rail when needed, for example when there is excess energy in the DC-rail.

In an embodiment the operation of one or both of the hoist motor and the gantry motor may be reversed and they may operate as generators of electrical energy. The electrical energy generated by the generator may be AC or DC. When the generators generate AC, but the bus comprises a DC-rail the generated AC must be converted by an inverter to be supplied to the DC-rail. In embodiments, where the electrical energy generated is DC and the bus comprises a DC-rail, inverters may be omitted.

Accordingly, instead of the hoist motor driving the hoist winch, the movement of the hoist winch may drive the hoist motor that transforms the movement into electrical energy in the form of AC. The generated AC is fed to the hoist inverter 238 for the generated AC to be converted into DC and to be supplied to the DC-rail. Similarly, instead of the gantry motor driving the wheel, the movement of the wheel may drive the gantry motor that transforms the movement into electrical energy in the form of AC. The generated AC is fed to the gantry inverter 240 for the generated AC to be converted into DC and to be supplied to the DC-rail.

The energy recovery system connects to the DC-rail via an inverter converting the DC to AC. The AC from the inverter is fed to the electric motor 204 that drives a hydraulic pump 206 The electric motor provides transformation of electrical energy into mechanical energy by using the AC from the inverter to rotate a drive shaft. The hydraulic pump connects to a hydraulic tank comprising hydraulic fluid via a hydraulic line. The hydraulic pump is driven by the drive shaft of the electric motor. The drive shaft provides a common axis that connects the hydraulic pump and the electric motor. The hydraulic pump may connect to the drive shaft via a mechanical coupling. In one example a gear box, e.g. reduction gear may be used to connect the hydraulic pump to the drive shaft. Accordingly, the hydraulic pump provides transformation of mechanical energy from the electric motor into movement of the hydraulic fluid.

In an embodiment the hydraulic pump comprises a fixed displacement pump, where a maximum volume flow rate of fluid per rotation ($V_{rot}$) of the pump is fixed. Examples of a fixed displacement pump comprise but are not limited to a gear pump, a rotary vane pump, a screw pump, bent axis pump, and axial piston pump using a swash plate.

The hydraulic pump sucks the hydraulic fluid from the tank and pushes the hydraulic fluid to one or more hydraulic accumulators 218 connected to the hydraulic pump by a hydraulic line. A valve 216 may be provided between the hydraulic pump and the hydraulic accumulators. The displacement of the hydraulic pump may be used to control the amount of hydraulic fluid displaced by the pump by the suction and pushing per a revolution of the pump.

The valve 216 may comprise a 2/2-way directional valve 2/2 proportional valve or a servo valve, for example. In the following discussion, the example of the valve being 2/2 proportional valve is described, without limiting to that example. When the hydraulic fluid is pushed to the hydraulic accumulators by the hydraulic pump, the check function of the valve is set open towards the hydraulic accumulators, to provide flow of the hydraulic fluid to the hydraulic accumulators. When the hydraulic accumulators are discharged, hydraulic fluid is pushed to the hydraulic pump and the check function of the valve is set open towards the hydraulic pump.

One or more sensors 220 and 222 may be connected to the hydraulic accumulators and arranged to detect an amount of potential energy stored in the hydraulic accumulators. Each of the sensors may connect to the hydraulic accumulators on a hydraulic line. The amount of potential energy stored in the hydraulic accumulators may comprise a charging level of the hydraulic accumulators. A minimum charging level indicates that the hydraulic accumulators need to be charged. When the charging level is at minimum, the hydraulic accumulators need to be charged before they can be used to supply energy to the bus. A maximum charging level indicates that the hydraulic accumulators store a maximum amount of potential energy. When the charging level is at its maximum the hydraulic accumulators cannot be charged and their charging must be stopped to avoid damaging the hydraulic accumulators.

In an embodiment the sensors may comprise pressure switches, where a first pressure switch is arranged to detect when the pressure of the hydraulic accumulators indicates a minimum charging level of the hydraulic accumulators, and a second sensor is arranged to detect when the pressure of the hydraulic accumulators indicates a maximum charging level of the hydraulic accumulators. The pressure indicating a minimum charging level may be 100 bars and the pressure indicating a maximum charging level may be 400 bars.

In an embodiment, the energy recovery system may comprise a safety valve 212 that provides a hydraulic line to the tank for the hydraulic fluid flowing between the hydraulic accumulator and the hydraulic pump. The safety valve is switched open, when a pressure exceeds a threshold pressure, whereby the hydraulic fluid discharges through the safety valve to the tank. The threshold pressure may be a pressure that is greater than a pressure of the hydraulic accumulators at a maximum charging level of the hydraulic accumulators.

The energy recovery system may comprise a filter 214 to keep the hydraulic fluid clean. The filter may be connected to a return path of the hydraulic fluid from the hydraulic accumulator and/or a return path of the hydraulic fluid from the safety valve.

In an embodiment, the filter is connected to a hydraulic line between the hydraulic accumulators and the hydraulic pump, via the safety valve. In this way the hydraulic fluid discharging through the safety valve may be cleaned.

In an embodiment, the filter is connected to a hydraulic line between the hydraulic pump and the tank. In this way the hydraulic fluid from the pump may be filtered.

In an embodiment the operation of the hydraulic pump and the electric motor may be reversed so that they may be used to transform energy between electrical energy and the flow of hydraulic fluid in both directions. Accordingly, when the operation of the hydraulic pump is reversed, the hydraulic pump may comprise a hydraulic motor. When the operation of the electric motor is reversed, the electric motor may comprise a generator of electric current.

Accordingly, when the operation of the hydraulic pump and the electric motor are reversed, hydraulic fluid discharging from the hydraulic accumulators may drive the hydraulic motor that transforms the flow of the hydraulic fluid into mechanical movement. The hydraulic motor is connected to the generator and the mechanical movement from the hydraulic motor is transferred to the generator. Thereby, the generator is driven by the mechanical movement from the hydraulic motor and the generator transforms the mechanical movement into electrical energy. The electrical energy may comprise AC or DC. In the embodiment described in FIG. 2*a*, the generator generates AC that is fed to the inverter 202 to be supplied to the DC-rail as DC.

The energy recovery system comprises a controller 226 for controlling the operation of the energy recovery system. The controller connects to the energy recovery system to receive information on the amount of potential energy stored in the energy recovery system and to determine whether the energy recovery system is operated to store energy from the bus or whether energy recovery system is operated to supply energy to the bus.

In an embodiment, the controller connects electrically to the pressure switches 222 and 220 to receive information on the amount of potential energy stored in the hydraulic accumulator.

In an embodiment the controller connects electrically to the 2/2-way directional valve to control the valve to enable the flow of hydraulic fluid to the hydraulic accumulator or from the hydraulic accumulator or to stop the flow of hydraulic fluid.

In an embodiment, the energy recovery system may comprise an encoder connected to the electric motor. The encoder determines the rotational speed of the electric motor and connects electrically to the controller to provide the rotational speed as an electric signal to a controller. The controller sets the rotational speed of the electric motor via the connection to the electric motor.

In embodiments the energy recovery system may further comprise a volume flow rate sensor 217 connected to the 2/2-way directional valve. The volume flow rate sensor provides the controller information of the volume flow rate passing through the 2/2-way-directional valve on an electric connection between the volume flow rate sensor and the controller.

In an embodiment, the controller 226 may connect electrically to means 223 for determining electrical properties of the DC-bus 260. The means 223 may comprise a device that measures e.g. voltage of the DC-bus, and/or any other electrical property of the DC. Based on the measured electrical properties a power requirement of the DC-bus may be determined. The means 223 may have the necessary processing power to determine the power requirement and output the power requirement to be used by the controller 226 in controlling the energy recovery system. According to another example the measured electrical properties or an indication of the measured electrical properties may be output to the controller 226 that determines the power requirement of the DC-bus on the basis of the information received from the means 223.

FIG. 2*b* illustrates an energy recovery system 201 similar to that described with reference to FIG. 2*a*. The energy recovery system of FIG. 2*b* uses the same components as described with reference to FIG. 2*a* above and denoted by same reference numerals.

According to an embodiment, the energy recovery system of FIG. 2*b*, the same hydraulic pump described above with reference to FIG. 2*a* may be used with the difference that the hydraulic pump of FIG. 2*b* comprises a variable displacement hydraulic pump 276 controlled by a controller 296 connected electrically to the variable displacement hydraulic pump. In a variable displacement pump and pump, the volume flow rate per rotation may be varied. The controller controls the displacement of the variable displacement pump via the electrical connection. Examples of a variable displacement pump comprise but are not limited to a rotary vane pump, a bent axis pump, axial piston pump using a swash plate.

By using an electrically controlled variable displacement pump in the energy recovery system, the displacement of the pump may be optimized. By controlling the displacement of the pump, the torque provided by the pump may be controlled, despite a change in the pressure of the hydraulic accumulator. This minimizes losses in the electric motor and increase overall response time of the system. With low flow rates the displacement can be set so that the rotation speed of the pump and therefore the rotation speed of the electric motor is in the range of high efficiency.

Figure 3:
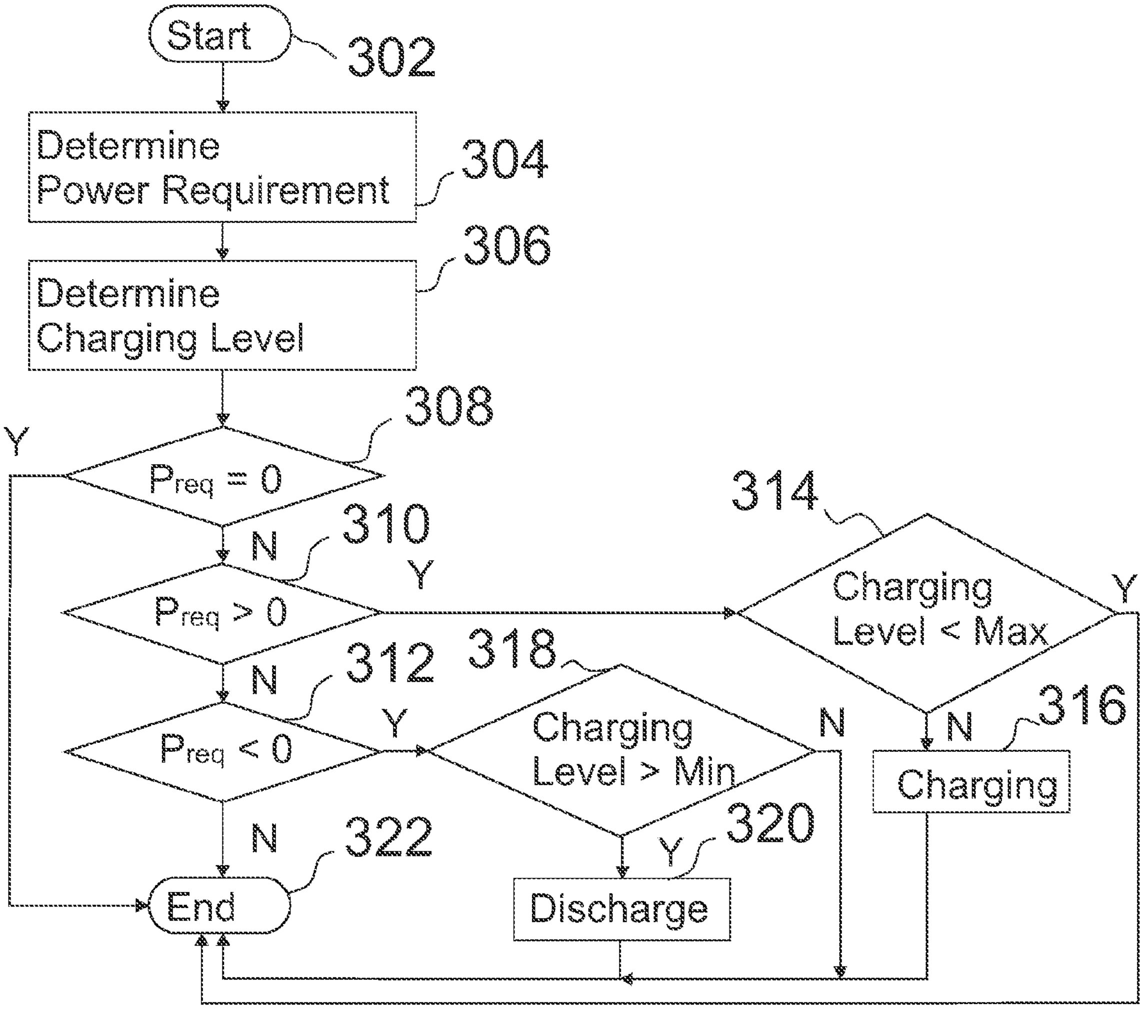
FIG. 3 illustrates a method of operating an energy recovery system according to an embodiment.

FIG. 3 illustrates a method of operating an energy recovery system according to an embodiment. The method may be performed by a controller of the energy recovery system, for example. In the method of FIG. 3, electrical energy from a bus is stored into potential energy to a hydraulic accumulator and potential energy stored into the hydraulic accumulator is supplied as electrical energy to the bus to provide power to one or more functions of an apparatus for moving cargo.

It should be appreciated that the method described below with FIG. 3 may be a method in a sequence of methods according to FIG. 4. In this way the energy stored from the bus according to the method of FIG. 4 may be supplied as energy to the bus in a method according to FIG. 4 executed next in the sequence. This provides energy stored from lowering a hoist winch in a gantry crane to be used to supply power to the wheels of the gantry crane and vice versa. Accordingly, in an apparatus for moving cargo comprising bus for transmission of electrical energy, energy stored from one function connected to the bus, may be used to power other functions of the apparatus by storing electrical energy from the bus as potential energy to the hydraulic accumulator; and by supplying the potential energy stored in the hydraulic accumulator as electrical energy to the functions of the apparatus being powered by the bus.

The energy recovery system may be the energy recovery system comprising a hydraulic accumulator described above with reference to FIGS. 2*a* and 2*b*. In the following the method is described as deployed in a gantry crane comprising a bus for transmission of electrical energy to different functions of the gantry crane. These functions may comprise the hoist winch and wheels as described in FIG. 2*a*.

The method begins in 302, where the energy recovery system as described above with reference to FIGS. 2*a* and 2*b* is deployed in a gantry crane. The energy recovery system enables cutting the peak power requirements of the main power supply of the gantry crane e.g. diesel engine. This is because, during the operation of the gantry crane, lifting and driving of the gantry may be powered from the energy stored in the energy recovery system. During the time when the energy recovery system is used as energy source, power is not needed from the main power supply. This provides decreasing the fuel consumption of diesel engines since they may be idling or stopped for the time energy is supplied from the energy recovery system.

In 304, a power requirement of the bus is determined. The power requirement may be determined by measuring the electrical properties of the bus, for example the voltage. The power requirement may be 0, when the power level of the bus is sufficient to provide power to all the functions of the gantry crane and there is no excess power in the bus to be stored in the energy recovery system. The power requirement may be greater than 0, when the bus has excess power to be stored and the power requirement may be less than 0, when more power should be supplied to the bus to power the functions of the gantry crane, e.g. when the hoist winch is used to lift a cargo container and/or the wheels need more power e.g. during acceleration.

In 306 a charging level of a hydraulic accumulator is determined. The determining may comprise receiving information of the amount of potential energy stored in the hydraulic accumulator. Accordingly, a controller of the energy recovery system may receive information of the pressure of the hydraulic accumulator from one or more sensors connected to the hydraulic accumulator. The information may comprise the pressure value, or an indicator of the pressure which the controller may use to determine a pressure or a range of pressures comprising the pressure currently prevailing in the hydraulic accumulator. The information may be received as a signal comprising the information, e.g. an electric signal. The controller determines on the basis of the received information a charging level of the hydraulic accumulator. The charging level may comprise whether the hydraulic accumulator is at minimum, maximum and/or partially charged.

In an embodiment, where the energy recovery system comprises a first pressure switch detecting a minimum pressure and a second pressure switch detecting a maximum pressure, the minimum pressure comprises a pressure, where the hydraulic accumulator is discharged and the maximum pressure indicates a pressure where the hydraulic accumulator is fully charged. Accordingly, when the minimum pressure is detected at the pressure switch for detecting the minimum pressure, the controller receives a signal indicating detection of the minimum pressure from the pressure switch for detecting the minimum value pressure. Similarly, when the maximum pressure is detected at the pressure switch for detecting the maximum pressure, the controller receives a signal indicating detection of the maximum pressure from the pressure switch. In this way the controller may determine charging levels of the hydraulic accumulator on the basis of the signals received from the pressure switches.

In 308 it is determined if the determined power requirement is 0. If the power requirement is 0, this means that the bus comprises no excess power that could be stored to the energy recovery system and there is no need for more power in the functions of the gantry crane or straddle carrier supplied by the bus, and the process proceeds to end 322. In an embodiment, when the power requirement is 0, the energy recovery system is stopped and it is not used to store or supply energy.

If the power requirement is not 0 in 308, there is either a need for more power in the bus, which may be satisfied at least partly by the energy recovery system, or there is excess power in the bus, which may be stored at least partly in the energy recovery system. Thus, if the power requirement is not 0, the process proceeds to 310.

In 310 it is determined whether the power requirement is greater than 0, in which case the bus comprises excess power and the process proceeds to 314 This may happen, when the hoist winch and/or the wheels do not require power, e.g. when cargo is not moved or no driving is performed, but power is still supplied to the bus from the diesel engine.

In another example, the bus may comprise excess power received from deceleration. The deceleration may comprise decelerating movement of a hoist winch and/or wheels of the gantry crane. The energy received from the deceleration may be transformed into electrical energy and supplied to the DC-rail.

Accordingly, when a cargo carried by the hoist winch is lowered from a high altitude, the potential energy stored in the height of the cargo may be transformed into electrical energy and supplied to the bus. This may be performed in the example of FIG. 2*a*, when the potential energy stored in the cargo lifted by hoist winch is released by the hoist winch when the cargo is lowered, whereby the hoist winch drives the hoist motor via the gearbox. The hoist motor operating as a generator converts the mechanical movement from the hoist winch to electrical energy. The AC generated by the hoist motor, is fed to the hoist inverter that converts the AC to DC and supplies the DC to the bus.

In another example, the bus may comprise excess power received from decelerating movement of the gantry crane. This may happen, when the gantry crane is engaged in a movement, whereby the gantry crane has kinetic energy stored in its movement. Upon deceleration of the movement, the kinetic energy may be transformed into electrical energy and supplied to the bus. This may be performed in the example of FIG. 2*a*, when the kinetic energy stored in the movement of the wheels may be released by the decelerating wheels, whereby the decelerating wheels drive the gantry motor via the gearbox and the gantry brake. The gantry motor operating as a generator converts the mechanical movement from the wheels into electrical energy. The AC generated by the gantry motor is fed to the gantry inverter that converts the AC to DC and supplies the DC to the bus.

If the power requirement is not greater than 0, the process proceeds to 312.

In 312 it is determined, if the power requirement is less than 0. In an embodiment, since in 308 and 310 is has already been determined that the power requirement is not 0 or greater than 0, the only valid possibility is that the power requirement is less than 0, the determining may be omitted and the process may proceed from 310 directly to 318.

In an embodiment, however, the determining in 312 may be performed. In this way possible errors in the determined power requirement may be determined, e.g. if the determined power requirement is not valid value. Accordingly, if the power requirement is not less than 0, it may be determined that an error situation has occurred and the process continues to end 322. Otherwise the process continues to 318.

In 318 it is determined if the charging level determined in 306 is greater than a minimum charging level of potential energy in the hydraulic accumulator. The minimum charging level may be determined as a pressure value. When the charging level is greater than the minimum charging level, the hydraulic accumulator has potential energy that may be supplied to the bus and the process proceeds to 320 to discharge the hydraulic accumulator. Otherwise the process proceeds to end 322, since the hydraulic accumulator may be determined as discharged, in which case, the energy recovery system cannot supply electrical energy to the bus even if the power requirement is less than 0 and indicates that more power is needed in the bus.

In 314 it is determined if the charging level determined in 306 is less than a maximum charging level of potential energy in the hydraulic accumulator. The maximum charging level may be determined as a pressure value. When the charging level is less than the maximum charging level the process proceeds to 316 to charge the hydraulic accumulator. Otherwise the hydraulic accumulator is determined as fully charged and thereby no more energy may be stored in the hydraulic accumulator, and the process proceeds to end 322.

In 316 the hydraulic accumulator is charged by the electrical energy being transformed into a flow of hydraulic fluid into the hydraulic accumulator. The transformation comprises an electric motor connected to the bus and driving a hydraulic pump that pumps hydraulic fluid from a tank into the hydraulic accumulator. The charging may continue as long as there is excess power in the bus to be stored in the hydraulic accumulator or the hydraulic accumulator is not full, in which case the process ends in 322.

It should be appreciated that the step 304 described above may be continuously performed, when the hydraulic accumulator is charged to determine whether the bus has excess power to be stored into the potential energy of the hydraulic accumulator.

It should be appreciated that the step 306 described above may be continuously performed, when the hydraulic accumulator is charged to determine whether the charging level of the hydraulic accumulator and when the hydraulic accumulator reaches the maximum charging level.

Figure 4A:
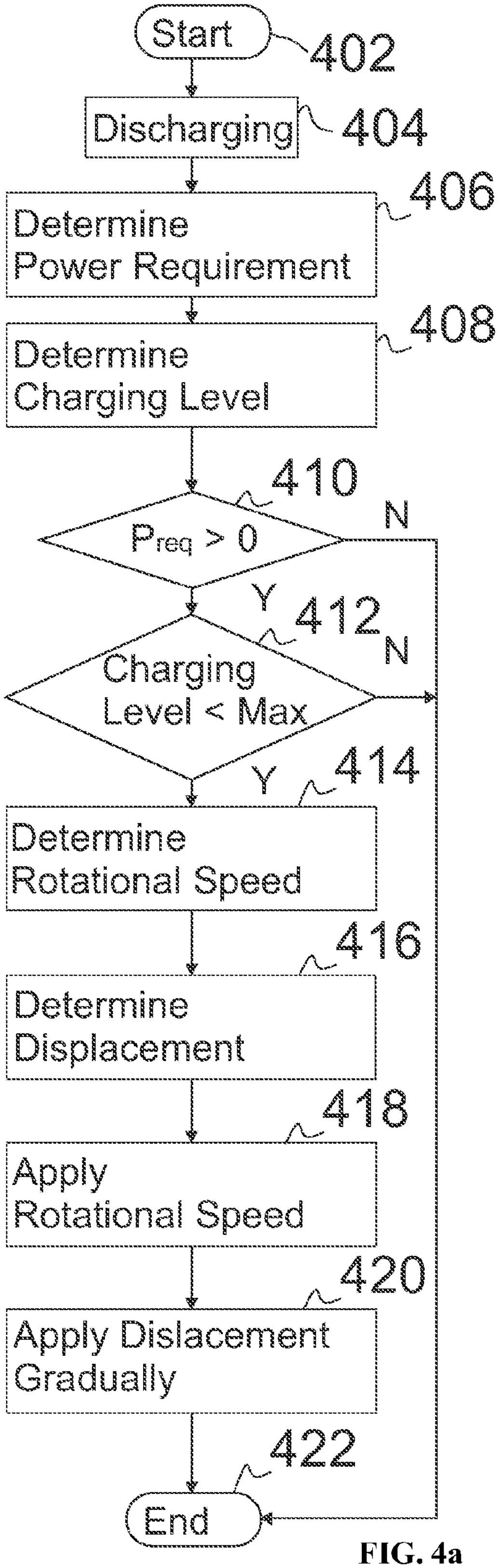
FIG. 4*a* illustrates a method of operating a variable displacement pump of an energy recovery system according to an embodiment.
Figure 4B:
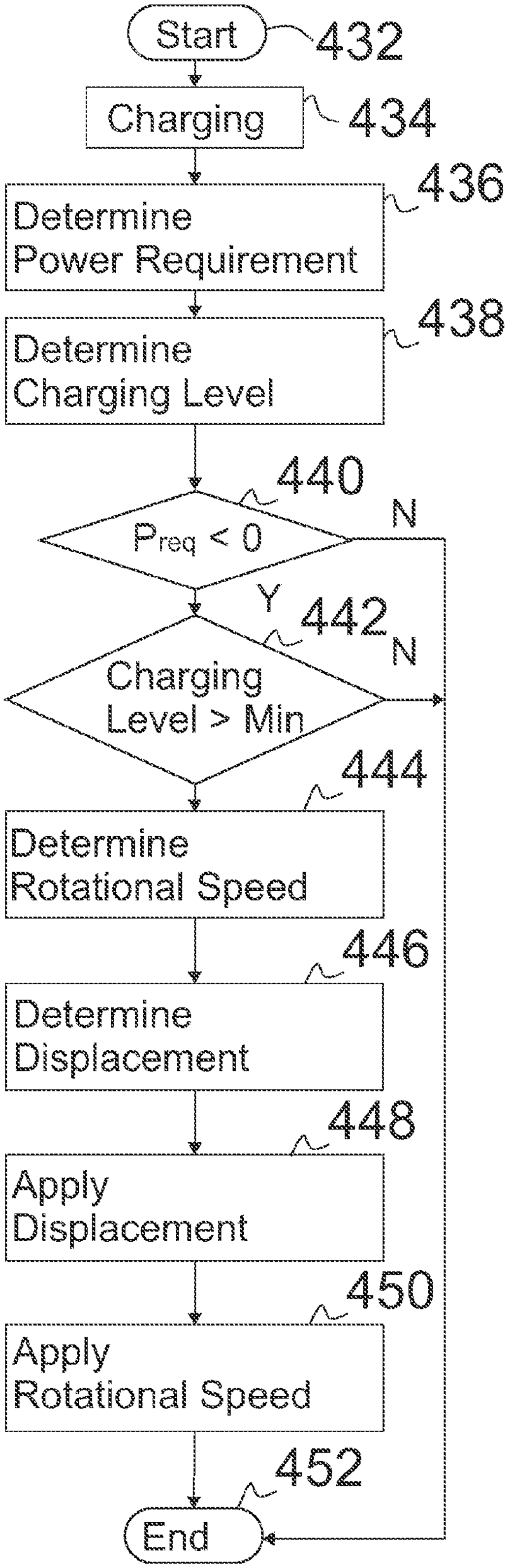
FIG. 4*b* illustrates a method of operating a variable displacement pump of an energy recovery system according to an embodiment.

FIGS. 4*a* and 4*b* illustrate a method of operating a variable displacement pump of an energy recovery system according to an embodiment. In the method of FIG. 4*a* a transition of the energy recovery system from discharging to charging is described. In the method of FIG. 4*b* a transition of the energy recovery system from charging into discharging is described. The methods provide decreasing latency involved in changing the operation from storing to supplying and vice versa. Accordingly, the method of FIG. 4*a* may be performed after the step 320 of FIG. 3 to reduce a latency of a transition between discharging and charging, and the method of FIG. 4*b* may be performed after the step 316 of FIG. 3 to reduce latency of a transition between charging and discharging.

The energy recovery system in methods of FIGS. 4*a* and 4*b* may be the energy recovery system comprising a hydraulic accumulator described in FIG. 2*b* for example. The methods may be performed by a controller of the energy recovery system, for example.

It should be appreciated that the methods described in FIGS. 4*a* and 4*b* may be performed in a sequence, where the method of FIG. 4*a* is performed when the energy recovery system changes from discharging to charging and the method of FIG. 4*b* is performed when the energy recovery system changes from charging to discharging.

It should be appreciated that a sequence of methods may comprise only a sequence of either one of the methods described in FIGS. 4*a* and 4*b*.

In the following the methods of FIGS. 4*a* and 4*b* are described as deployed in a gantry crane comprising a bus for transmission of electrical energy to different functions of the gantry crane. These functions may comprise the hoist winch and wheels as described in FIG. 2*a*.

The process of FIG. 4*a* starts in 402, where the energy recovery system is deployed into the gantry crane and the hydraulic accumulator of the energy recovery system is charged up to a charging level to supply electrical energy to the bus, to power the hoist winch and/or the wheels.

In 404 the potential energy is discharged from the hydraulic accumulator, transformed into electrical energy and supplied into the bus to be used by the hoist winch and the wheels of the apparatus. The discharging may be performed as explained above with reference to step 320 of FIG. 3, for example.

Referring back to FIG. 4*a*, in 406 a power requirement of the bus is determined similar to step 304 of FIG. 3.

In 408 a charging level of the hydraulic accumulator is determined similar to step 306 of FIG. 3.

In 410 it is determined whether the power requirement is greater than 0, similar to step 310 in FIG. 3. When the power requirement is greater than 0, the bus comprises excess power and the process proceeds to 412.

In 412 it is determined if the charging level determined in 408 is less than a maximum charging level of potential energy in the hydraulic accumulator similar to step 314 of FIG. 3. When the charging level is less than a maximum, more energy may be stored to the hydraulic accumulator, and the hydraulic accumulator may be charged. If the charging level is less than the maximum charging level the process proceeds to 414, to charge the hydraulic accumulator. Otherwise the process proceeds to end 422.

In 414 a rotational speed of the electric motor is determined to charge the hydraulic accumulator. The rotation speed of the electric motor is determined based on the wanted power level and the pressure level in the accumulator. The rotation speed can be set to be the maximum rotation speed of the pump or lower speed based on below equations, which may be predefined. The power of the electric motor may be defined as follows:

$$P=M*2\pi*n_{rot} \quad (1),$$

where P [W] is the power consumed or generated by the electric motor, M [Nm] is the torque measured from the drive shaft of the electric motor and $n_{rot}$ [Hz] is the rotational speed of the electric motor.

A hydraulic accumulator storing potential energy in a pressurised fluid, e.g. gas, of an energy recovery system is designed with a maximum operating pressure, the hydraulic accumulator may store and a minimum pressure of the hydraulic accumulator at which the hydraulic accumulator may still drive the hydraulic pump with needed power level, when the hydraulic fluid is discharged from the hydraulic accumulator to the hydraulic pump. The minimum operating pressure of the hydraulic pump may be defined as follows:

$$P_{min}=(2\pi*M)/(V_{rot}*\eta_{hm}) \quad (2),$$

where $V_{rot}$ [$m^3$] is the maximum volume displaced per rotation of the hydraulic pump, M [Nm] is the torque needed by the pump and $\eta_{hm}$ is a hydro mechanical efficiency coefficient of the hydraulic pump.

In 414, a rotational speed of the hydraulic-pump motor may be defined on the basis of the predefined equations (1) and (2), when the power consumed by the electric motor P is the power requirement determined in 406.

In 416 a displacement of the hydraulic pump may be determined, when the hydraulic pump of the energy recovery system comprises a variable displacement hydraulic pump.

In an embodiment, where the hydraulic pump has a fixed displacement, this step may be omitted, and since the displacement is constant.

A hydraulic pump produces a torque as defined by:

$$M=(\Delta p*V_{rot}*\eta_{hm})/(2\pi) \quad (3),$$

where $\Delta p$ [Pa] is the difference of pressure measured over the hydraulic pump, $V_{rot}$ [$m^3$] is the maximum volume displaced per rotation of the hydraulic pump and $\eta_{hm}$ is a hydro mechanical efficiency coefficient of the hydraulic pump. Then the displacement of the hydraulic pump for charging the hydraulic accumulator may be determined on the basis of equations (1) and (3) after the $n_{rot}$ has been determined in 414 and when the power consumed by the electric motor P is the power requirement determined in 406.

In an embodiment, the torque of the hydraulic pump is less or equal to a maximum torque of the electric motor driving the hydraulic pump or driven by the hydraulic pump. In this way the torque from the hydraulic pump may be kept at a range of efficiency of the electric motor, which provides efficient transformation of the energy from the hydraulic accumulator into electrical energy. In some cases limiting the torque may also provide increased operating life and/or maintenance interval of the electric motor.

In an embodiment a displacement of the hydraulic pump may be determined as a volume displaced by the hydraulic pump per rotation of the pump. In an example, where the hydraulic pump motor comprises an axial piston pump using a swash plate, and displacement may be determined as a swash plate angle. The swash plate angle may be determined as an angle between a rotating axis of the cylinder and the swash plate.

In 418 the rotational speed determined in 414 may be set to the electric motor and the direction of rotation of the electric motor may be reversed. The setting may comprise transmitting a command to the electric motor comprising the rotational speed and the direction of rotation.

In 420, the displacement determined in 416 is set gradually to the hydraulic pump. In this way the determined rotational speed in 414 may be achieved faster, as the displacement is set to the determined value only after the rotational speed has reached the determined value.

In an embodiment, where the variable displacement pump comprises an axial piston pump using a swash plate, the swash plate angle is set by gradually setting the swash plate angle from 0 displacement to the determined displacement angle.

In an embodiment, where the charging level of the hydraulic accumulator is at a minimum level after discharging in 404, the hydraulic pump has to be charged so that it can be used to provide power to the bus. Thereby, at the minimum charging level, the hydraulic accumulator cannot be used to supply energy to the bus, but the following operation mode must be the charging mode. Then, the displacement of the pump may be set to 0 before the direction and speed of rotation of the hydraulic pump is set in 414. In this way the operation of the pump may be changed from a motor discharging the hydraulic accumulators, into a pump for charging the hydraulic accumulator. The charging may be started with only a small latency since only the displacement needs to be set into the value determined in 414.

In 422 the process ends, after setting the displacement and rotational speed of the hydraulic pump.

Referring now to FIG. 4*b* illustrating a method of operating a variable displacement pump of an energy recovery system according to an embodiment and where the energy recovery system changes from charging to discharging.

The process starts in 432, where the energy recovery system is deployed into the gantry crane and the hydraulic accumulator of the energy recovery system is not fully charged, thereby allowing charging.

In 434, electrical energy is charged into the hydraulic accumulator, comprising transforming electrical energy from the bus into movement of hydraulic fluid into the hydraulic accumulator to be stored as potential energy of the hydraulic accumulator. The charging may be performed as explained above with reference to step 316 of FIG. 3, for example.

In 436 a power requirement of the bus is determined similar to step 304 of FIG. 3.

In 438 a charging level of the hydraulic accumulator is determined similar to step 306 of FIG. 3.

In 440 it is determined whether the power requirement is less than 0 similar to step 312 FIG. 3. When the power requirement is less than 0, more power needs to be supplied to the bus and the process proceeds to 442. Otherwise the process proceeds to end 452.

In 442 it is determined if the charging level determined in 538 is greater than a minimum charging level of potential energy in the hydraulic accumulator similar to step 318 of FIG. 3. When the charging level is greater than a minimum, the hydraulic accumulator comprises enough potential energy that the potential energy may be transformed into electrical energy and supplied to the bus, to satisfy the need of power in the bus. Otherwise there is not enough energy to be supplied to the bus in the hydraulic accumulator and the process proceeds to end 452.

Determining of the rotational speed in step 444 and determining of the displacement in step 446 may be performed as described above respective steps 414 and 416 with FIG. 4*a*.

In 448 the displacement may be set to the variable displacement pump, in a similar manner as described with step 420 of FIG. 4*a*. However, as a difference to step 420, herein the displacement should be set directly to the determined value.

In an embodiment, where the variable displacement pump comprises an axial piston pump using a swash plate, the swash plate angle is set to the determined displacement angle.

In 450 the rotational speed determined in 434 may be set to the electric motor and the direction of rotation of the electric motor may be reversed, similar to described in step 418 of FIG. 4*a*.

It should be appreciated that there may be latency involved between setting the setting of the rotational speed and direction of the electric motor and the time when the determined rotational speed is actually reached. During the latency between setting and actually reaching the rotational speed in the electric motor, the power provided from the electric motor may be low compared to the power obtained when the electric motor is at the determined rotational speed.

Accordingly, in an embodiment, in step 448 of FIG. 4*b* the displacement may be set greater than the determined displacement angle during the acceleration of the electric motor to the determined speed. In this way a greater torque from the hydraulic pump may be provided to the electric motor during acceleration of the electric motor and more power may be supplied to the bus already during the acceleration of the electric motor.

Accordingly, in an embodiment of FIG. 4*a*, the latency involved between setting the setting of the rotational speed and direction of the electric motor and the time when the determined rotational speed is actually reached may be employed in setting the displacement gradually, whereby the displacement of the variable displacement hydraulic pump may be increased to the determined value directly proportionally to the acceleration of the electric motor.

An embodiment provides a computer program embodied on a distribution medium, comprising program instructions which, when loaded into an electronic apparatus, constitute an apparatus for moving cargo or at least part of the apparatus, e.g. the controller 226, 296, described earlier.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a programmable logic controller, a single electronic digital computer or it may be distributed amongst a number of computers.

The controller 226, 296 may also be implemented as one or more integrated circuits, such as application-specific integrated circuits ASIC. Other hardware embodiments are also feasible, such as a circuit built of separate logic components or a programmable logic circuit. A hybrid of these different implementations is also feasible. When selecting the method of implementation, a person skilled in the art will consider the requirements set for the size and power consumption of the controller 226, 296, necessary processing capacity, production costs, and production volumes, for example.

The steps/points, signaling messages and related functions described above in FIGS. 3, 4*a* and 4*b* are in no absolute chronological order, and some of the steps may be performed simultaneously or in an order differing from the given one. Other functions can also be executed between the steps or within the steps. Some of the steps or part of the steps can also be left out or replaced by a corresponding step or part of the step. The controller 227, 296 operations illustrate a procedure that may be implemented in one or more physical or logical entities.

Apparatuses for moving cargo, such as gantry cranes, straddle carriers, fork lifts, lifttruck or other corresponding devices or apparatuses implementing the functionality of a corresponding apparatus described with an embodiment comprise not only prior art means, but also means for providing a bus for transmission of electrical energy, means for providing at least one load connected to the bus, said at least one load configured to transform electrical energy from the bus into movement of a cargo with respect to the apparatus, means for transforming energy between electrical energy of the bus and potential energy of a hydraulic accumulator, means for storing electrical energy from the bus as potential energy to the hydraulic accumulator, and means for supplying the potential energy stored in the hydraulic accumulator as electrical energy to the load. More precisely, they comprise means for implementing functionality of a corresponding apparatus described with an embodiment and they may comprise separate means for each separate function, or means may be configured to perform two or more functions. Present apparatuses comprise processors and memory that can be utilized in an embodiment. For example, the controller 226, 296 may be a software application, or a module, or a unit configured as arithmetic operation, or as a program (including an added or updated software routine), executed by an operation processor. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a controller, may be configured as a computer or a microprocessor, such as single-chip computer element, including at least a memory for providing storage area used for arithmetic operation and an operation processor for executing the arithmetic operation. An example of the operation processor includes a central processing unit. The memory may be removable memory detachably connected to the apparatus.

It is useful and environmentally friendly way to upgrade an existing apparatus for moving cargo, e.g. like straddle carrier, gantry crane, lift truck or fork lift to operate according to the above described embodiments. Several benefits can be pointed out: energy savings, longer operation time between refueling, less exhausts per driven kilometer, longer lifespan of existing apparatus for moving cargo, longer lifespan of existing engine to name a few.

It is as well useful to upgrade an existing apparatus for moving cargo like straddle carrier, gantry crane, lift truck or fork lift by using a prepared kit. A kit can be prepared according different standards (electrical, mechanical) for different markets, models and sizes, and its installation is shorter with a good preparation and planning, which in turn gives a short down-time in production. Also maintenance is more fluent after upgrading, when known combination of parts are used, rather than using a selection of random choice for each upgrade.

Accordingly, in an embodiment it is provided a kit for upgrading an apparatus for moving cargo is provided. The kit may comprise a hydraulic accumulator for storing and supplying energy, an energy transforming means configured to transform energy between electrical energy and potential energy of the hydraulic accumulator, and controller means configured to control the transformer and the hydraulic accumulator to store electrical energy from the from the bus as potential energy to the hydraulic accumulator and supply the potential energy stored in the hydraulic accumulator as electrical energy.

The transformation of energy between electrical energy may be provided as explained above with reference to the above Figures, e.g. any one FIGS. 1, 2*a* and 2*b*. The transformation may be performed e.g. the trans-former 112 of FIG. 1.

The controller means may be provided as explained above with reference to the above Figures, e.g. any one FIGS. 1, 2*a* and 2*b*. For example the Controller means may comprise the controller 116 of FIG. 1 and/or PLC 226 FIG. 2*a* or PLC 296 in FIG. 2*b*.

The hydraulic accumulator may be provided as explained above with reference to the above Figures, e.g. any one FIGS. 1, 2*a* and 2*b*. For example the Controller means may comprise the hydraulic accumulator 110 of FIG. 1.

In an embodiment a method for upgrading an apparatus for moving cargo is provided using the kit for upgrading according to an embodiment. In the method the kit is installed to the apparatus for moving cargo. It should be appreciated that upgrading an existing apparatus for moving cargo provides various advantages.

For upgrading an apparatus for moving cargo, e.g. a conventional straddle carrier or gantry crane, with "Hydraulic energy recovery system" following parts can be used as an example:

1. Inverter
2. Electric motor equipped with encoder
3. Coupling (between motor and hydraulic pump)
4. Hydraulic pump (fixed displacement or alternatively variable displacement)
5. Hydraulic accumulator(s)
6. Accumulator safety valve
7. Pressure switches (2 pieces for indication of accumulator charging status)
8. Directional valve (black and white, resp. proportional)
9. Hydraulic filter
10. Check-Valve
11. Pressure relief valve
12. Hydraulic tank
13. Hydraulic hosing and piping adapted to individual machine
14. Electric wiring adapted to individual machine
15. Electronic controller card for variable displacement pump
16. Electronic controller card for proportional valve
17. Modification of machine PLC program
18. Supports and brackets for installation of components adapted to individual machine.

It should be appreciated that the above list of components is only an example and one or more of the components may be omitted from the kit. In particular, those components may be omitted, that are not needed to achieve one or more of the advantages described in the above embodiments and with reference to the accompanying Figures. It should be appreciated that in an embodiment an apparatus for moving cargo may be upgraded by a computer program embodied on a distribution medium, comprising program instructions which, when loaded into an electronic apparatus, constitute an apparatus for moving cargo or at least part of the apparatus, e.g. the controller 226, 296, described earlier.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus for moving cargo comprising:

a bus for transmission of electrical energy;

at least one load connected to the bus, said at least one load configured to transform electrical energy from the bus into movement of a cargo with respect to the apparatus;

energy transforming means configured to transform energy between electrical energy of the bus and potential energy of a hydraulic accumulator, wherein the energy transforming means comprises a variable displacement pump, wherein the apparatus is configured to:

store electrical energy from the bus as potential energy to the hydraulic accumulator by the variable displacement pump supplying hydraulic fluid to the hydraulic accumulator for transforming electrical energy from the bus into potential energy of the hydraulic accumulator;

supply the potential energy stored in the hydraulic accumulator as electrical energy to the at least one load;

determine a rotational speed and displacement of the variable displacement pump for charging the hydraulic accumulator on the basis of the potential energy stored in the hydraulic accumulator;

set the determined rotational speed to the variable displacement pump; and set the displacement gradually to the variable displacement pump.

2. The apparatus according to claim 1, wherein the at least one load is configured to feed electrical energy to the bus upon decelerating movement of the cargo; and the apparatus is configured to:

store the electrical energy from the decelerating movement into potential energy of the hydraulic accumulator; and upon accelerating movement of the cargo, the at least one load is configured to:

supply the potential energy stored from the decelerating movement in the hydraulic accumulator as electrical energy to the bus to power the accelerating movement.

3. The apparatus according to claim 1, comprising a plurality of loads connected to the bus, each of the plurality of loads configured to transform electrical energy from the bus into mechanical movement, said plurality of loads comprising a drive function configured to move the apparatus on a surface, and a cargo movement function configured to move a cargo carried by the apparatus with respect to the apparatus.

4. The apparatus according to claim 1, comprising a plurality of loads connected to the bus, wherein the plurality of loads comprise a first load configured to transform electrical energy from the bus into movement of the apparatus in a first plane, and a second load configured to transform electrical energy from the bus into movement of the apparatus in a second plane; wherein, the said first and second plane are substantially perpendicular.

5. The apparatus according to claim 1, comprising an electric motor connected to the bus, wherein the variable displacement pump is connected to the hydraulic accumulator, the electric motor is arranged to drive the variable displacement pump when electrical energy from the bus is stored as potential energy to the hydraulic accumulator, and the variable displacement pump is arranged to drive the electric motor, when potential energy stored in the hydraulic accumulator is supplied as electrical energy to the load.

6. The apparatus according to claim 1, wherein the apparatus comprises a gantry crane, straddle carrier, fork lift or a lifttruck.

7. A kit for upgrading an apparatus for moving cargo comprising:

a hydraulic accumulator for storing and supplying energy;

an energy transforming means configured to transform energy between electrical energy and potential energy of the hydraulic accumulator, wherein the energy transforming means comprises a variable displacement pump; and controller configured to control the transformer and the hydraulic accumulator to store electrical energy from the from the bus as potential energy to the hydraulic accumulator by the variable displacement pump supplying hydraulic fluid to the hydraulic accumulator for transforming electrical energy from the bus into potential energy of the hydraulic accumulator, supply the potential energy stored in the hydraulic accumulator as electrical energy, determine a rotational speed and displacement of the variable displacement pump for charging the hydraulic accumulator on the basis of the potential energy stored in the hydraulic accumulator, set the determined rotational speed to the variable displacement pump, and set the displacement gradually to the variable displacement pump.

8. A method comprising:

providing a bus for transmission of electrical energy;

providing at least one load connected to the bus, said at least one load configured to transform electrical energy from the bus into movement of a cargo with respect to an apparatus;

transforming energy between electrical energy of the bus and potential energy of a hydraulic accumulator by means of a variable displacement pump;

storing electrical energy from the bus as potential energy to the hydraulic accumulator by the variable displacement pump supplying hydraulic fluid to the hydraulic accumulator for transforming electrical energy from the bus into potential energy of the hydraulic accumulator;

supplying the potential energy stored in the hydraulic accumulator as electrical energy to the load;

determining a rotational speed and displacement of the variable displacement pump for charging the hydraulic accumulator on the basis of the potential energy stored in the hydraulic accumulator;

setting the determined rotational speed to the variable displacement pump; and setting the displacement gradually to the variable displacement pump.

9. The method according to claim 8, comprising:

the at least one load feeding power to the bus upon decelerating movement of the cargo;

storing the electrical energy from the decelerating movement into potential energy of the hydraulic accumulator; and upon accelerating movement of the cargo, supplying the potential energy stored from the decelerating movement in the hydraulic accumulator as electrical energy to the bus to power the accelerating movement.

10. The method according to claim 8, comprising:

providing the variable displacement pump connected to the hydraulic accumulator and, an electric motor connected to the bus;

driving the variable displacement pump with the electric motor when electrical energy from the bus is stored as potential energy to the hydraulic accumulator, and driving the electric motor with the variable displacement pump, when potential energy stored in the hydraulic accumulator is supplied as electrical energy to the at least one load.

11. The method according to claim 10, wherein the displacement of the variable displacement pump is set to its maximum, when the torque of the variable displacement pump is below a maximum torque.

12. The method according to claim 8, the method comprising:

providing the variable displacement pump connected to the hydraulic accumulator to be driven by hydraulic fluid discharged from the hydraulic accumulator;

determining a rotational speed and a displacement of the variable displacement pump for discharging the hydraulic accumulator on the basis of the potential energy stored in the hydraulic accumulator; setting the determined displacement to the variable displacement pump greater than the determined displacement during acceleration of the variable displacement pump to the determined rotational speed.

13. The method according to claim 8, comprising:

providing the variable displacement pump connected to the hydraulic accumulator and, an electric motor connected to the bus; said variable displacement pump and hydraulic accumulator being connected to provide transformation of energy between the hydraulic accumulator and the bus;

operating the variable displacement pump to charge or discharge the hydraulic accumulator;

determining a direction of rotation of the variable displacement pump;

reversing the direction of rotation of the variable displacement pump, when the hydraulic accumulator is substantially charged or substantially discharged; and setting the displacement of the variable displacement pump to a minimum.

14. The method according to claim 8, comprising:

installing a kit for upgrading an apparatus for moving cargo, the kit comprising:

a hydraulic accumulator for storing and supplying energy;

an energy transforming means configured to transform energy between electrical energy and potential energy of the hydraulic accumulator; and controller means configured to control the transformer and the hydraulic accumulator to store electrical energy from the from the bus as potential energy to the hydraulic accumulator and supply the potential energy stored in the hydraulic accumulator as electrical energy; wherein the method comprises the upgraded apparatus performing the steps comprising:

providing a bus for transmission of electrical energy;

providing at least one load connected to the bus, said at least one load configured to transform electrical energy from the bus into movement of a cargo with respect to an apparatus;

transforming energy between electrical energy of the bus and potential energy of a hydraulic accumulator;

storing electrical energy from the bus as potential energy to the hydraulic accumulator; and supplying the potential energy stored in the hydraulic accumulator as electrical energy to the load.

15. An apparatus comprising:

means for providing a bus for transmission of electrical energy;

means for providing at least one load connected to the bus, said at least one load configured to transform electrical energy from the bus into movement of a cargo with respect to an apparatus;

means for transforming energy between electrical energy of the bus and potential energy of a hydraulic accumulator, wherein means for transforming energy comprises a variable displacement pump;

means for storing electrical energy from the bus as potential energy to the hydraulic accumulator by the variable displacement pump supplying hydraulic fluid to the hydraulic accumulator for transforming electrical energy from the bus into potential energy of the hydraulic accumulator;

means for supplying the potential energy stored in the hydraulic accumulator as electrical energy to the load;

means for determining a rotational speed and displacement of the variable displacement pump for charging the hydraulic accumulator on the basis of the potential energy stored in the hydraulic accumulator;

means for setting the determined rotational speed to the variable displacement pump; and means for setting the displacement gradually to the variable displacement pump.

16. A computer program embodied on a non-transitory computer readable storage medium, the computer program being configured to control an apparatus comprising:

a bus for transmission of electrical energy;

at least one load connected to the bus, said at least one load configured to transform electrical energy from the bus into movement of a cargo with respect to the apparatus; and energy transforming means configured to transform energy between electrical energy of the bus and potential energy of a hydraulic accumulator, wherein the energy transforming means comprises a variable displacement pump, and the computer program is configured to control the apparatus to perform a method comprising:

storing electrical energy from the bus as potential energy to the hydraulic accumulator by the variable displacement pump supplying hydraulic fluid to the hydraulic accumulator for transforming electrical energy from the bus into potential energy of the hydraulic accumulator;

supplying the potential energy stored in the hydraulic accumulator as electrical energy to the load;

determining a rotational speed and displacement of the variable displacement pump for charging the hydraulic accumulator on the basis of the potential energy stored in the hydraulic accumulator;

setting the determined rotational speed to the variable displacement pump; and setting the displacement gradually to the variable displacement pump.

17. A method of upgrading an apparatus for moving cargo comprising, installing to the apparatus a kit for upgrading an apparatus for moving cargo comprising:

a hydraulic accumulator for storing and supplying energy;

an energy transforming means configured to transform energy between electrical energy and potential energy of the hydraulic accumulator wherein the energy transforming means comprises a variable displacement pump; and a controller configured to control the transformer and the hydraulic accumulator to store electrical energy from the from the bus as potential energy to the hydraulic accumulator by the variable displacement pump supplying hydraulic fluid to the hydraulic accumulator for transforming electrical energy from the bus into potential energy of the hydraulic accumulator, supply the potential energy stored in the hydraulic accumulator as electrical energy, determine a rotational speed and displacement of the variable displacement pump for charging the hydraulic accumulator on the basis of the potential energy stored in the hydraulic accumulator, set the determined rotational speed to the variable displacement pump, and set the displacement gradually to the variable displacement pump.

* * * * *